July 24, 1951     E. M. DELORAINE     2,561,345
POSITION RECORDING SYSTEM
Filed April 9, 1945     4 Sheets-Sheet 3
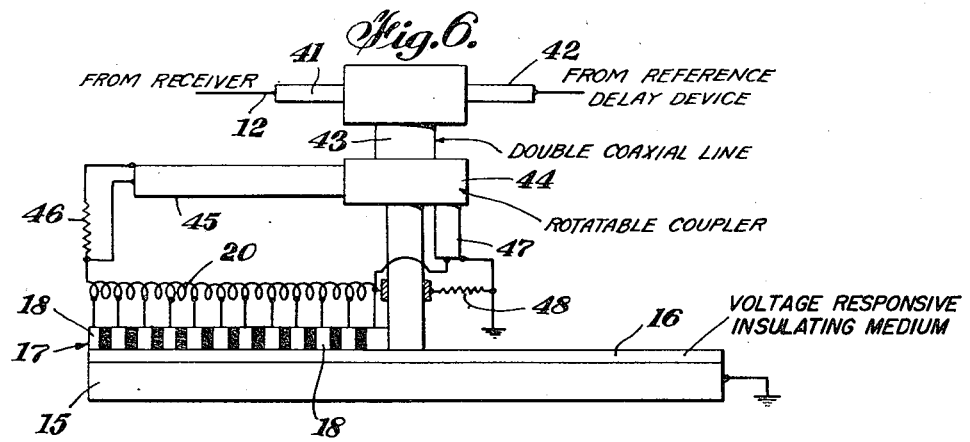
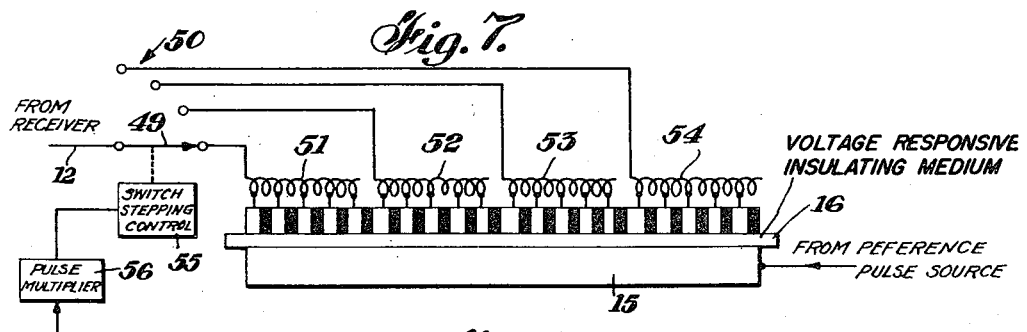
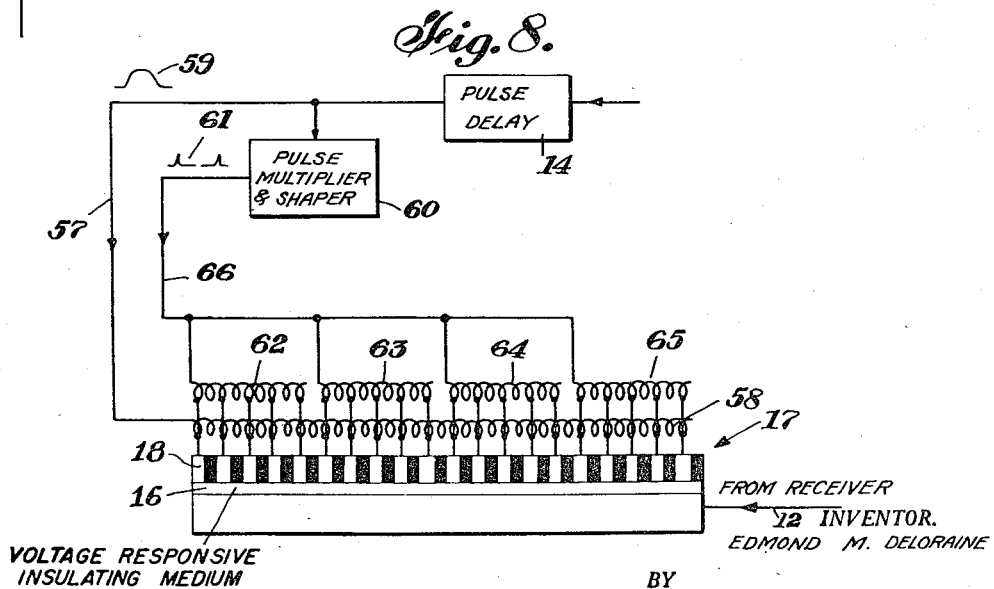
INVENTOR.
EDMOND M. DELORAINE
BY
R. P. Morris
ATTORNEY

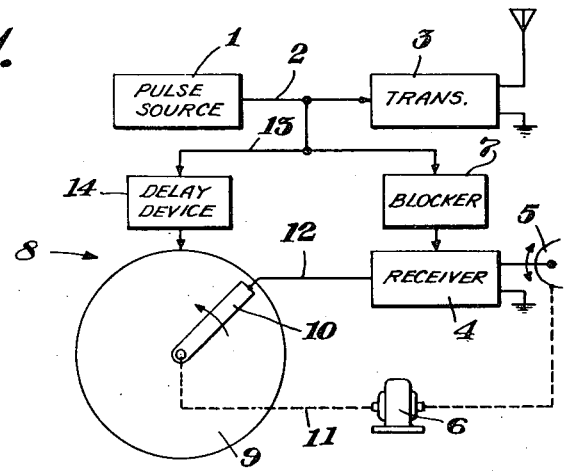
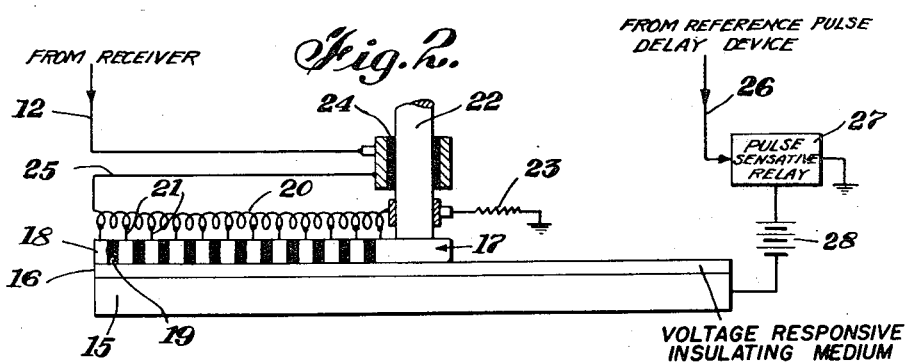
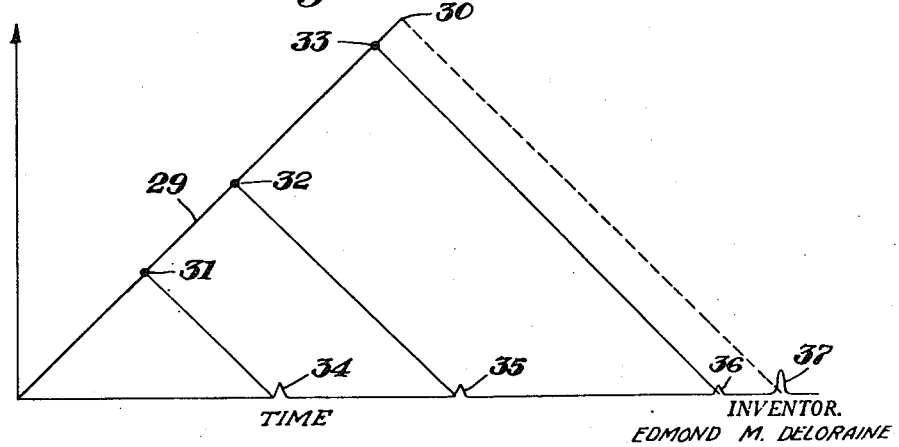

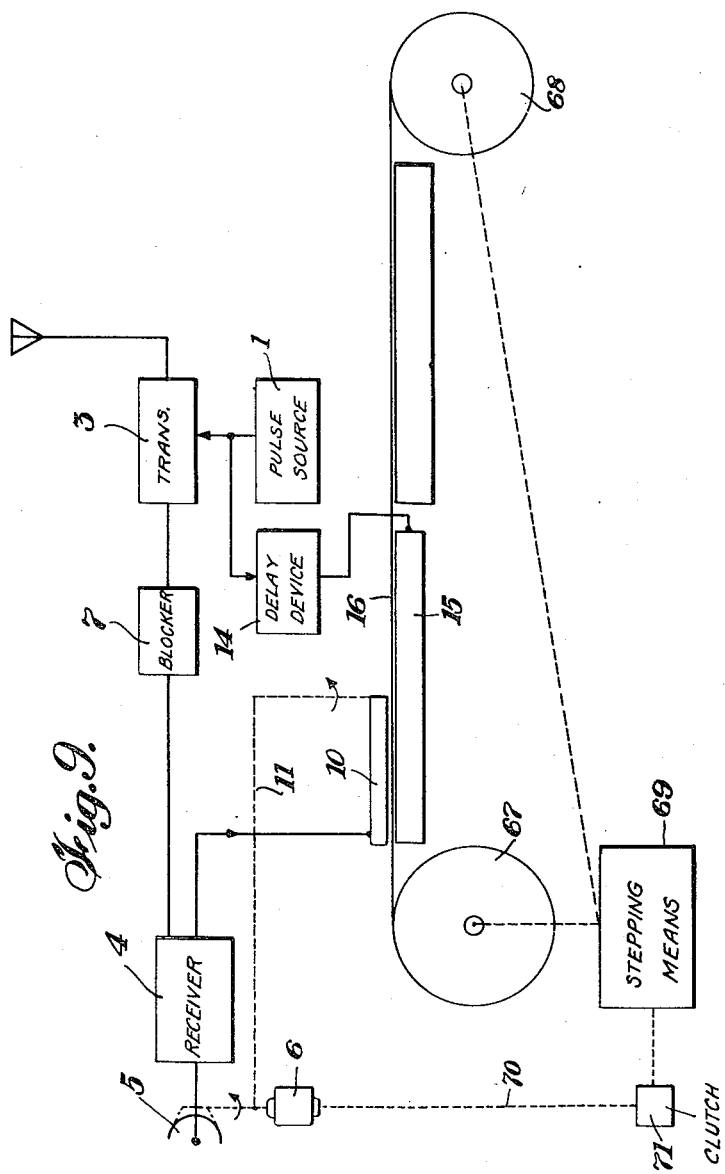

Patented July 24, 1951

2,561,345

UNITED STATES PATENT OFFICE 2,561,345

POSITION RECORDING SYSTEM

Edmond M. Deloraine, New York, N. Y., assignor to Federal Telephone and Radio Corporation, New York, N. Y., a corporation of Delaware Application April 9, 1945, Serial No. 587,241

18 Claims. (Cl. 346—33)

This invention relates to radio indicating and recording systems and methods and more particularly to an indicating and recording system for showing the position of reradiating objects relative to a given location.

Position indicating equipment wherein the distance and/or angular location of radiating objects is obtained has generally been made utilizing cathode ray oscillograph indicators. Such indicators, however, are limited in size since the size of the map or area of indication is limited by the screen of the cathode ray tube. If the images on the cathode ray tube are projected to a larger area they become correspondingly dimmer and harder to read. Furthermore, cathode ray indicators are difficult to read in the bright light such as ordinary daylight and the indications made thereon are not permanent. Moreover, particularly on traveling craft and the like where it is desired to chart a source of a moving object, indications from a cathode ray tube must be transcribed manually to a map. It is clear that in most instances the navigator reading these instruments must be in a chamber shielded from the direct light of the sun in view of the difficulty of reading the instruments otherwise. These various limitations therefore detract from the usefulness of the generally known types of indicators.

It is an object of my invention to provide an indicating and/or recording system responsive to voltage pulses operating to make indications and/or recordings on a responsive medium.

It is a still further object of my invention to provide a system for making distance and direction indicating recordings showing the relative location of reradiating objects on the indicating and/or recording medium, which may comprise a map.

It is a still further object of my invention to provide an indicating system responsive to received pulses wherein the pulses are delayed in order to locate them in proper indicating position and properly synchronized means is provided to increase the voltage level at the correct instant to provide a voltage indicating level across the indicating medium.

It is a still further object of my invention to provide a system for producing location determining indications and/or recording of reradiating or reflecting objects on a voltage sensitive medium by means of pulses directionally received from the reradiating objects in timed relationship with respect to their spacing and in angular relationship with respect to their azimuth position.

It is a still further object of my invention to provide a system for producing distance indications and/or recording wherein pulses are delayed into indicating relationship so as to effect a distribution of the pulses relative to the indicating medium which corresponds to the geographical distribution of the objects which produce the pulses. The pulses are then caused to produce on a voltage sensitive medium permanent recordings in these distributed positions.

It is a still further object of my invention to provide apparatus including a delay line wherein pulses are delayed for distribution over a given indicating surface and wherein an additional voltage may be applied to these distributed pulses to produce a necessary indicating potential.

According to a feature of my invention as applied to a position indicator, I provide a counter or backing electrode over which is mounted a voltage sensitive medium and a distributing electrode mounted on the other side of the medium. The distributing electrode is preferably made with a plurality of spaced conducting or marking electrodes and is provided with a distributing means including a delay line which will produce suitable distribution of pulses to the marking electrodes, only certain of the latter ordinarily being effective at one time. The voltage level of these distributed pulses is preferably insufficient by itself to produce a recording on the voltage sensitive medium. A second voltage is therefore added to produce the desired voltage level for recording. This voltage may be applied to the counter electrode or to the distributing electrode so that the combined effect will produce a sufficient voltage to make a mark on the paper. If the distributing electrode and recording medium are then moved relative to one another, for example by rotation with respect to each other, the distributed pulses will be spread out not only in time for distance indicating but also in angle for additional azimuth indications. There is thus provided a permanent record of all of the objects, the position of which it is desired to record. Furthermore, since these recordings are not made purely by light, additional illumination of the indicating surface will not obliterate the indications but will make them more readily visible.

A better understanding of my invention and the objects and features thereof may be had from the particular description thereof made with reference to the accompanying drawings, in which:

Fig. 1 is a block circuit diagram of a position indicating system which may be utilized with my invention;

Fig. 2 is an illustration in greater detail of a particular recording arrangement that may be utilized with the system of Fig. 1;

Fig. 3 is a diagram of pulse distribution used in explaining the operation of the system of Fig. 2;

Fig. 6 is a still further modification of the indicating arrangement;

Figs. 7 and 8 are still further modifications illustrating the multiple delay line arrangement wherein the attenuation in any one section may be reduced; and Fig. 9 is a diagrammatic illustration of a system provided with means for moving the recording medium into position for better observation.

Figure 4:
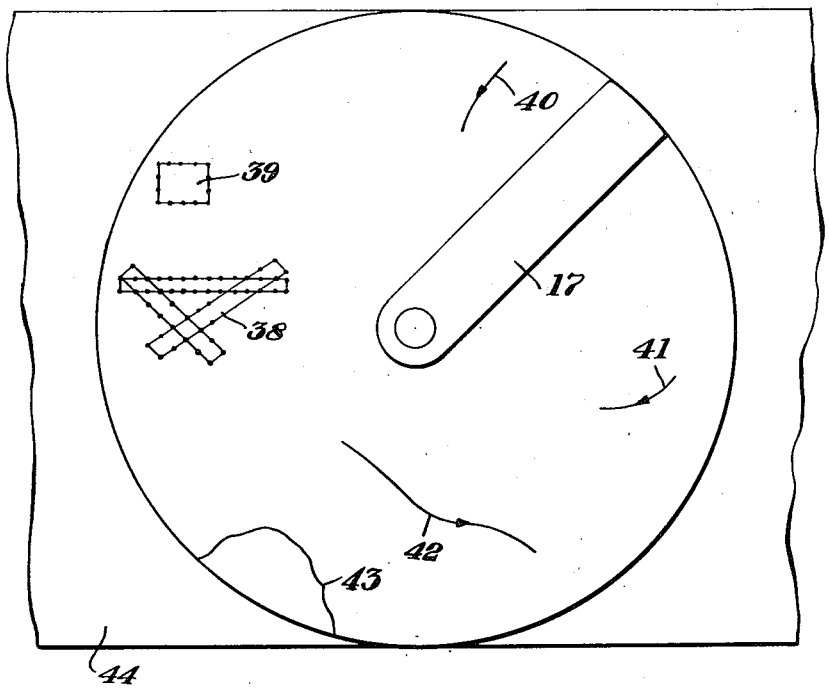
Fig. 4 is an illustration of the surface of an indicator showing how indications might appear thereon.

Turning first to Fig. 1, I have illustrated a simple position indicating circuit of the type commonly referred to as radar together with a diagrammatic showing of an indicator incorporating the principles of my invention. In this system, pulses from a pulse source 1 are applied over line 2 to a pulse transmitter 3. These transmitted pulses will be reflected or otherwise reradiated from objects in the field of the transmitter for return to the receiver 4. Receiver 4 is supplied with signal energy from a rotatable directive antenna 5 which is rotated at a predetermined speed by motor 6. During the period of transmission, receiver 4 is blocked by pulse energy from source 1 and blocker circuit 7. With this type of system it is clear that the received pulse energies will be spaced in time in accordance with the distance from the receiving and transmitter apparatus and will be angularly indicated in accordance with the position of antenna 5 at the time the energy is received. In the conventional indicating system these received signals are applied to a cathode ray type of oscilloscope or some other type of oscilloscope for the purpose of indicating the relative position of these reradiating objects.

According to my invention, I provide an indicator 8 which may include means for supporting an indicating medium 9 of voltage responsive material. A distributing electrode 10 is mounted in proximity to the surface of material 9 and is rotated in synchronism with the rotatable antenna 5 by means of drive means indicated at 11. The received signals from receiver 4 are applied by way of line 12 to distributing electrode 10 which comprises a delay line with sufficient delay to produce distribution representing the distances to be measured. Reference pulses from source 1 are applied over lines 2 and 13 and a delay device 14 to indicator 8. These reference pulses are delayed sufficiently to develop across recording medium 9 a recording voltage at a time in which a pulse reflected from an object at maximum range of the system would arrive at its proposed indicating position in distributing electrode 10.

It will be clear that these reference pulses and the received pulses may be applied in a number of different manners to the indicator 8 in order to produce the desired recording. Furthermore, it will be evident that the particular type of indicating circuit and system arrangement illustrated in Fig. 1 is given merely by way of example. Any type of system wherein the distribution of pulses is desired may be used with the recording instrument of my invention. For example, the type of arrangement may be used wherein a fixed beacon system on the ground serves to produce indications on a movable craft of reradiating objects. The arrangement described for example in copending application of H. G. Busignies, Serial No. 579,568, filed February 24, 1945, now Patent No. 2,546,970, April 3, 1951, may be used for producing the received pulses and the reference pulses for the purpose of producing the desired indications. Moreover, the principles of my invention may be used with other types of indicators and the position indicating systems.

In Fig. 2 is illustrated by way of example one form of indicator arrangement embodying the features of my invention. In this indicator, a supporting counter electrode 15 is provided and mounted on the upper surface of this electrode is a voltage responsive medium 16 such as voltage responsive paper or the like. A distributing electrode 17 is mounted above the surface of paper 16 for relative rotation with respect thereto. This electrode comprises a plurality of alternate conducting and insulating segments or indicating electrodes 18 and 19 and coupled thereto a line 20. Line 20 is coupled to the discrete segments 18 by means of separate connectors shown at 21. This line together with the capacity between the segments and the counter electrode 15 is in the form of a delay line which will serve to distribute the applied pulses over a shorter space than the free radiations occupy, as determined by the dimension and scale of the map. Electrode 17 is shown as being mounted on a rotatable shaft 22 and at this shaft one end of line 20 is coupled to a matching resistor 23. The received pulses are applied over the receiver output line 12, slip rings 24 and conductor 25 to the outer end of conductor 20. The first reradiated pulse received will immediately start traveling inwardly, that is toward the driving shaft 22, along line 20 while the later received pulses will follow it inwardly along the line.

At a time when any desired received pulses would be properly distributed in line 20, a pulse from reference pulse delay device 14 (Fig. 1) is applied over line 26 to a pulse sensitive relay 27 which serves to couple battery 28 between electrode 15 and ground applying a negative potential to this electrode. This negative potential in cooperation with the positive pulse potential in line 20 will serve to produce a sufficiently high voltage to make a recording on paper 16. It will be clear that if the pulse incoming over line 26 is of sufficient magnitude, this pulse may be applied directly to electrode 15 instead of utilizing the trigger relay 27 and the potential source 28.

The timing of the pulses for proper distribution may be more readily understood by reference to Fig. 3. Line 29 may represent the outward travel time of the transmitted pulse to point 30 which represents the maximum distance at which reradiating objects are to be detected and indicated. Separate reradiating objects may be located along this line of travel at 31, 32 and 33, for example. When the radiated pulse reaches these reradiating objects, a pulse is reradiated for reception in the receiver. The received pulses will be distributed in time as indicated at 34, 35, 36. It will be evident that pulse 34, which is first received, will be closer to the center of line 20 than will be the other pulses. The reference pulse 37 will then be applied at a time as indicated after all possible received pulses are distributed within the line 20. It will thus be seen that for this purpose the reference pulse must be delayed an amount equal to twice the travel time of the pulse to the maximum range of the system. The delay per unit length along the indicator or map, must be twice the travel time in free space of the pulses over the actual distance represented by said unit length.

It will be remembered that as described in connection with Fig. 2 a relative rotation between electrode 17 and recording medium 16 is produced. Since the rotating electrode 17 will pass each reradiating object each revolution, charting of the movement or progress of such objects may be readily accomplished. In Fig. 4 is illustrated a typical indication which may be produced on the indicating medium. In this arrangement an airport having landing strips 38 and a hangar 39 is shown. These objects may be permanently drawn on the map before use and if, in addition, reradiating objects such as active or passive radio repeaters, are arranged along the runway, etc. to outline the same, the reradiators will also be shown as spots or lines on the map. Tracings 40, 41 and 42 may represent aircraft, the tracings 40 and 41 indicating aircraft approaching the landing field while the tracing 42 indicates an aircraft departing therefrom. The indications may not show in which direction the craft are traveling, but the observer may readily note in which direction the lines are building and put arrowheads indicating the direction of travel thereon. Another prominent obstruction, for example, is shown at 43. This may represent a hill or the like.

The entire recording may be made on a strip of map material or paper at 44 or individual indicating maps may be inserted as desired.

Any of various types of voltage sensitive paper such as used for example in facsimile recording, or other recording medium, may be used with this system. Some of these recording papers are quite critical in operation so that a small difference in potential may serve to produce a mark while a potential very little below this level will not produce any marking. Furthermore, some of the papers are made so that a marking will show on both sides of the paper. In the latter instance, it may be preferable to mount the map or indicating surface in such a position that it may be viewed through the electrode 15 so that the rotating arm will not interfere with observation during the recording. If such an arrangement is desired, electrode 15 may be made of some transparent material provided with a light permeable or transparent coating of metal such as gold or the like so that observation of the map may be made from this side. The definition, however, may be better on the upper surface of the paper adjacent electrode 17. If this is the case, for more detailed observation, the paper may be removed and the map read from this upper surface. If it is desired that the markings be only on one surface of the system, then known facsimile reproducing paper of the type in which the metalized or other conducting coating is arranged on the back side of the paper may be used. In this instance, the paper itself may serve as a counter electrode.

Figure 5:
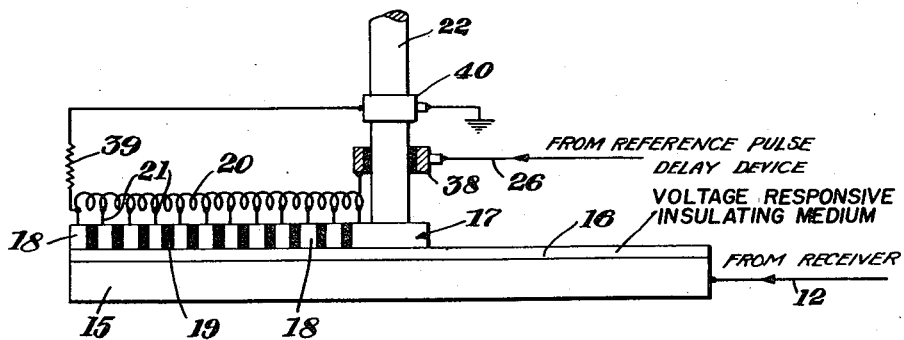
Fig. 5 is a modified form of recorder indicating structure.

In Fig. 5 is shown a recording system similar to that shown in Fig. 2 except in this arrangement the reference pulse is applied over a delay line 26 and slip-rings 38 to the inner end of the line 20. The pulses from the receiver are applied over line 12 to the counter or backing electrode 15. The reference pulse will then travel along line 20 from the inner terminal thereof outwardly to the far end where it will be absorbed in a terminating resistance 39 through a slip-ring 40 to ground. As the reference pulse travels along line 20, the receiver pulses will be applied in their timed received relationship to electrode 15. Every time the receiver pulses strike plate 15, sufficient voltage will be developed by a combination of these received pulses and the reference pulse to make a marking on paper 16. Thus it will be seen that the indications produced may be identical to those produced in the system shown in Fig. 2.

In Fig. 6 I have illustrated a still further modification of my invention. In this arrangement the pulses from the receiver come in over a coaxial line 41 while the reference pulses come in over a line 42. These coaxial lines are combined into a double coaxial line section 43 and coupled through a rotatable couple 44 to the rotatably supported electrode 17. The received pulses are branched through the output coaxial line 45 and connected to the outer end of delay line 20. A terminating resistance 46 is provided between the inner conductor of line 45 and the outer conductor thereof to prevent reflection of pulses traveling along line 20 from the opposite direction. The reference pulses are brought out of coupler 44 over a second coaxial line 47 and applied to the inner end of line 20. An impedance 48 is provided for matching lines 20 and 47 to prevent the received pulses from being reflected at this end of the line. It will thus be seen that in line 20 there are two sets of pulses, the received pulses traveling inwardly over line 20 and the reference pulse traveling outwardly thereover. The delay for the reference pulse may be accomplished by means of the delay device indicated by block 14 of Fig. 1. In this instance, the delay for the reference pulse should be made equal to the one-way travel time of the pulse transmitted from the receiver to a position corresponding to the maximum range of the system. The pulses from the two sources will travel in opposite directions in line 20. Whenever the reference pulse and a received pulse coincide in line 20, the voltage applied to the corresponding segment 18 will be equal to the summation of these two pulses. This summation voltage is chosen sufficiently high so that a recording voltage will be produced through the paper 16 to electrode 15. Electrode 15 may be maintained at some desired fixed potential as ground potential, for example.

It will be evident with this system that the line 20 may be made half the length of line 20 in the system shown in Figs. 2 and 5 for covering the same distance scale on the map. Therefore, the delay in the line may be half that of the previously described systems. Alternatively, the range of the system may be extended with the same length delay line as used in the other system.

In all of the arrangements shown in Figs. 2, 5 and 6, I have shown a simple continuous delay line. However, in every instance, it must be borne in mind the delay must be accomplished without too great a distortion or too great an attenuation of the pulses so that the voltage levels, of narrow pulses, necessary to produce a recording can be obtained. If a single length of delay line is insufficient for this purpose, the line may be broken into parts and repeating amplifiers coupled thereto to increase the amplitude of the pulses so that proper voltage level may be maintained. The amplifiers may be mounted to rotate with the shaft so that an excessive number of slip-ring connections and consequent distortion may be avoided. In the case of the system shown in Fig. 6, the repeating amplifiers will have to be made two-way repeaters since there are pulses traveling in both directions. This may be accomplished through the use of suitable hybrid coils and the like. The amplifier arrangements have not been illustrated since they are not specifically a part of the invention. However, they may be readily applied by any one skilled in the art.

In Fig. 7 is shown another embodiment wherein a multiple delay line is used to secure suitable effective delay without successive attenuation or distortion. In this arrangement the pulses from the receiver 12 are applied over a rotatable contact 49 of a switch 50, selectively to individual delay lines 51, 52, 53 and 54. While this switch is illustrated as a mechanical switch for ease of explanation, it could actually consist of some equivalent electronic means (e. g. a cathode ray beam distributor or a series of switching tubes, controlled by a counting chain of "Thyratrons" so as to successively connect line 12 to the lines 51—54). It will be understood, of course, that as many line sections as are required may be used. Movable contact 49 of switch 50 (or the corresponding electronic emitting means) may be controlled by a switch stepping control mechanism 55 (e. g. a "Thyratron" counting chain) successively to couple line 12 with the separate delay transmission lines. This stepping control mechanism may be controlled by pulses incoming from the pulse circuit over a pulse multiplier 56 serving to produce stepping pulses timed with relationship to the transmitted pulses so that the pulses received in the first time interval will be applied to line 51 and the pulses received during succeeding time intervals to lines 52, 53 and 54. Thus there will appear an effective distribution of the received pulses in the same manner as in the continuous line system.

It will of course be clear that instead of applying the received pulses to lines 51 to 54 inclusive, the received pulses may be applied to electrode 15 and the reference pulse applied successively to lines 51, 52, 53 and 54.

In Fig. 8 is shown a still further embodiment of my invention wherein multiple line sections may be used to avoid too great an attenuation of sharp indicating pulses. In this arrangement, the reference pulse is applied over a delay line 14 and line 57 to one end of a long delay line 58. This reference pulse is preferably made relatively broad and with sloping edges as shown at 59. Such a pulse will tolerate a much greater delay without excessive attenuation or phase distortion. The pulse from output of delay 14 is also applied to a multipler 60 which serves to produce a plurality of sharp pulses 61 corresponding in number to the short line sections of delay lines 62, 63, 64 and 65. These multiplied sharp pulses are applied over line 66 to each of lines 62, 63, 64 and 65 in parallel. The pulses incoming from the receiver over line 12 are applied to the counter or backing electrode 15. Line 58 and each of lines 62, 63, 64 and 65 are coupled at discrete intervals to separate indicating segments 18 of the distributor electrode 17. Preferably the line 58 is shielded from lines 62—65, and the coupling of these lines to segments 18 is sufficiently loose so that no substantial part of the energy from lines 62—64 will be transferred into line 58. The combined voltage of the received pulses and reference pulses 59 and 61 is necessary to produce an impression on the recording medium 16.

Pulse 59 travels the full length of line 58. While passing line 62 it will coincide with the first sharp pulse from pulse multiplier 60 and thus the segments 18 which are energized by the sharp pulse in line 62 will also have an additional energization from this broad pulse 59. Thus, the broad pulse 59 may be conceived of as raising the narrow pulse up to a higher voltage level and thus carrying it along over the length of line 62. When pulse 59 passes this line then the second pulse from multiplier 60 will be applied so that while the pulse passes line 63 the second pulse will be carried along effectively with it. The same action will occur in the succeeding sections 64 and 65 so that the effect is that of a double pulse, having as a base portion pulse 59 with a superposed sharp pulse 61 thereon traveling the full length of electrode 17. The timing of this travel along the delay line is adjusted in the same manner as in the other circuits described so that suitable distribution will be achieved and the recording of the position of objects will be accomplished in the same way as in previously described systems. It should be understood that the principle of the double delay line may be applied to all forms of the indicator described.

As so far described, the system has been shown with a sheet of paper for a single recording mounted between the electrodes. In some instances, it may be desired to read the indications produced upon each revolution of the recording device. In Fig. 9 is illustrated an arrangement for accomplishing this purpose. The recording paper 16 is mounted on two rollers or drums 67 and 68 so that a continuous strip may be fed between the electrodes 10 and 15. A stepping means 69 is provided to operate upon rollers 67 and 68 to step the paper forward one recording position. This stepping means may be controlled from motor 6 over a shaft 70 and a clutch 71 so that the paper may be selectively stepped forward one recording position for each revolution of arm 10 of the indicator or left in position for continuous recording as desired. Merely by operating clutch 71 the stepping means may be coupled or decoupled from shaft 70.

While I have disclosed herein a few simple embodiments illustrating the principles of my invention, it will be clear that many modifications thereof will occur to those skilled in the art. Various types of delay lines and various types of indicator arrangements may be used with the system. Furthermore, the broad principles of my invention need not be applied to position indication systems but will apply as well to many types of recording systems. Moreover, while I have referred to the recording medium as paper, it is clear that other types of recording mediums which are voltage sensitive may be used. Furthermore, while in the preferred arrangement permanent recordings are indicated, it is clear that any type of medium wherein indications can be made which will be retained for a reasonable length of time may be used. This latter type of medium may be preferred where it is desired to operate the arrangement to obtain instantaneous indications of positions.

It should be distinctly understood that the various modifications illustrated herein are given merely by way of example and are not to be considered as limitations upon my invention as set forth in the objects thereof and in the accompanying claims.

I claim:

1. In a pulse-echo system of the type wherein energy pulses are transmitted and received, an artificial transmission line, means to apply a voltage pulse to one end of said line each time a pulse is transmitted, a sheet of electro-sensitive material, means to apply a predetermined voltage stress to said material along a predetermined axis each time an energy pulse is received, means comprising said line to apply a second voltage stress to said material, said second stress being applied to one point in said material on said axis when a pulse is transmitted and progressively applied from said line to points spaced away from said first point along said axis as said voltage pulse travels along said line, said predetermined voltage stresses being insufficient in themselves to mark said material but sufficient together to produce a visible indication at a point on said axis where said stresses coincide in time, thereby to indicate on said material the distance of a remote object.

2. In a pulse-echo system of the type wherein energy pulses are directively transmitted or received, an artificial transmission line, means to apply a voltage pulse to one end of said line each time a pulse is transmitted, a sheet of electro-sensitive material, means to apply a predetermined voltage stress to said material each time an energy pulse is received, said stress being applied along an axis on said material corresponding to the direction of said energy pulses, means comprising said line to apply a second voltage stress to said material, said second stress being applied to one end of said axis on said material when a pulse is transmitted and progressively applied from said line to points spaced away from said end as said voltage pulse travels along said line, said predetermined voltage stresses being insufficient in themselves to mark said material but sufficient together to produce a visible indication at a point on said axis where said stresses coincide in time, thereby to indicate on said material the location of said remote objects.

3. A system for making a direction and distance indicating recording of voltage pulses on a voltage responsive recording medium, comprising transmission line electrode means positioned to overlie one surface of said medium for providing a distance and direction indicating distribution of the voltage pulses over said medium, a voltage source, and means for applying voltage from said source to the other surface of said medium to produce an effective recording voltage level across said medium in cooperation with said distributed voltage pulses.

4. A system for making a distance and direction indicating recording of voltage pulses, comprising a voltage responsive recording medium, a rotatable delay means overlying one surface of said medium for providing direction and distance indicating distribution of the voltage pulses over said medium, a voltage source, and means for applying voltage from said source to the other surface of said medium to produce an effective recording voltage level across said medium in cooperation with said distributed voltage pulses.

5. A recording system for making indications on a recording medium responsive to electrical pulse energy, comprising a source of indicating electrical pulses, a reference electrical pulse source, means for propagating pulses from one of said sources along a given path contiguous with said medium, means for applying pulses from the other source to said medium, and means responsive to the combined energy levels of said propagated pulses from said one source and the pulses from said other source to produce recording indications according to the time positions of said indicating pulses relative to the timing of said reference pulses on said recording medium.

6. A system according to claim 5 wherein said one source comprises said source of indicating pulses.

7. A system according to claim 5 wherein said one source comprises said reference pulse source.

8. A system according to claim 5 wherein said recording medium is adapted for mounting between said propagating means as one electrode and a backing plate as a counter electrode, the pulses from said other source being applied to said counter electrode with a polarity opposite to the polarity of the pulses from said one source.

9. A system according to claim 5, wherein said recording medium is adapted for mounting between said propagating means as one electrode and a backing plate maintained at a given potential as a counter electrode, further comprising means for applying pulses from said other source to said propagating means at the opposite end from that to which the pulses from said one source are applied, whereby said predetermined energy level occurs between said electrodes when said pulses coincide.

10. A system according to claim 5, wherein said indications comprise distance indications of pulse reflecting objects, further comprising means for producing a relative angular movement between said propagating means and said recording medium to provide angular indications.

11. A system according to claim 5, wherein said propagating means comprises a multisection delay line, and means for successively coupling said one source to successive delay line sections.

12. A recording indicator system for producing indications on a potential responsive recording medium, comprising a first electrode comprising a backing plate, a second electrode comprising a bar of spaced conducting segments interconnected by a conductor coil to form a delay line in cooperation with said backing plate, said indicating medium being mounted between said electrodes, a source of indicating pulse potentials, a source of reference pulse potentials, the combined pulse potentials being sufficient to produce recording indications on said medium, and means for combining the potentials from said two sources between said first electrode and particular ones of the spaced conducting segments of said second electrode.

13. A system according to claim 12, further comprising means for producing a relative rotation between said second electrode and said indicating medium.

14. A system according to claim 12, wherein said means for combining comprises means for coupling one of said sources to one end of said delay line means, the other of said sources to the other end of said delay line means, and means for maintaining said first electrode at a given reference potential.

15. A position recording receiver system for making recordings on a voltage responsive medium comprising receiver means for receiving pulses in timed relation with respect to the distance of said source, means for supplying reference pulses, delay line means for distributing one set of the pulses over said recording medium in spacing corresponding to the timed relation of said received pulses, means for applying said distributed pulses to said medium, and means for applying the other set of pulses to said medium in predetermined timed relation to produce coincidence therewith to provide a recording voltage for said recording medium.

16. A position recording receiver system for making recordings on a voltage responsive medium comprising receiver means for receiving pulses in timed relation with respect to the distance of said source and in direction lines in accordance with their azimuth positions, electrode means for distributing said received voltage pulses over said recording medium in distance corresponding to the timed relation, means for rotating said delay line relative to said medium to angularly distribute said voltage pulses in accordance with direction lines of said received pulses, a source of reference pulses timed with respect to said received pulses, a second electrode means on the other side of said medium from said first electrode means, and means for applying said reference pulses to said second electrode means to apply a recording potential to said medium.

17. A position recording receiver system for making recordings on a voltage responsive medium, comprising receiver means for receiving pulses in timed relation with respect to the distance of said source and in direction lines in accordance with their azimuth positions, a source of reference pulses timed with respect to said received pulses, means for deriving a broad sloping pulse and a plurality of sharp reference pulses from said reference pulses, a first delay line having a delay corresponding to the delay desired for the entire recording interval, a second delay means comprising a plurality of delay lines corresponding in number to said plurality of sharp pulses, means for applying said broad pulse to said first delay line and said sharp pulses to said second delay means, means for combining said pulses in said first and second delay means to produce a combined traveling effective reference pulse, means for applying said combined pulse to said recording medium, means for applying said received pulses to said recording medium to produce a recording potential corresponding in position to said reradiating objects, and means for producing a relative rotation of said delay means and said recording medium to provide directional displacement of said indications.

18. Means for producing an effective relatively long delay of sharp pulses, comprising a source of selectively broad pulses, a source of relatively narrow pulses having a repetition rate equal to a multiple of the repetition rate of said relatively broad pulses, delay means having an overall relatively long delay of a predetermined interval, a plurality of delay means equal in number to the multiple of the repetition rate of said broad pulses, means for applying said broad pulses to said first-named delay means, means for applying said sharp pulses in parallel to said plurality of delay means, and means for combining the energy in said first-named delay means and said plurality of delay means.

EDMOND M. DELORAINE.

REFERENCES CITED

The following references are of record in the file of this patent:

UNITED STATES PATENTS

| Number | Name | Date |
|---|---|---|
| 894,886 | Herrick | Aug. 4, 1908 |
| 1,874,196 | Lamson | Aug. 30, 1932 |
| 1,924,174 | Wolf | Aug. 29, 1933 |
| 2,011,381 | Suits | Aug. 13, 1935 |
| 2,199,634 | Koch | May 7, 1940 |
| 2,236,134 | Gloess | Mar. 25, 1941 |
| 2,394,990 | Eisler et al. | Feb. 19, 1946 |
| 2,403,561 | Smith | July 9, 1946 |
| 2,414,265 | Lawson | Jan. 14, 1947 |

FOREIGN PATENTS

| Number | Country | Date |
|---|---|---|
| 813,404 | France | Feb. 22, 1937 |
| 108,556 | Australia | Sept. 14, 1939 |
| 552,072 | Great Britain | Mar. 22, 1943 |